(12) United States Patent
Nomura

(10) Patent No.: US 7,974,515 B2
(45) Date of Patent: Jul. 5, 2011

(54) OPTICAL DISK DEVICE

(75) Inventor: Kosaku Nomura, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1223 days.

(21) Appl. No.: 11/646,411

(22) Filed: Dec. 28, 2006

(65) Prior Publication Data

US 2007/0147802 A1     Jun. 28, 2007

(30) Foreign Application Priority Data

Dec. 28, 2005   (JP) .................. 2005-379550

(51) Int. Cl.
    *H04N 9/80*    (2006.01)
(52) U.S. Cl. ...................... 386/241; 386/353
(58) Field of Classification Search .................. 386/126, 386/46, 241, 353
    See application file for complete search history.

(56) References Cited

U.S. PATENT DOCUMENTS

| | | | |
|---|---|---|---|
| 2004/0018007 A1* | 1/2004 | Akita | 386/125 |
| 2005/0084236 A1* | 4/2005 | Itoh | 386/46 |

FOREIGN PATENT DOCUMENTS

| | | |
|---|---|---|
| JP | 2000-285656 | 10/2000 |
| JP | 2001-167565 | 6/2001 |
| JP | 2002-238025 A | 8/2002 |
| JP | 2002-252813 | 9/2002 |

OTHER PUBLICATIONS

Japanese Office Action dated Aug. 24, 2010.

* cited by examiner

*Primary Examiner* — Thai Tran
*Assistant Examiner* — Girumsew Wendmagegn
(74) *Attorney, Agent, or Firm* — Pillsbury Winthrop Shaw Pittman, LLP

(57) ABSTRACT

A storage means, for each optical disk, and for each title recorded upon that optical disk, stores whether or not it is a replay-completed title. And an output means separates the titles recorded upon an optical disk which is loaded into replay-completed titles and titles which are not replay-completed, based upon the contents stored in the storage means, and selectively outputs a first title menu image consisting of the replay-completed titles, or a second title menu image consisting of the titles which are not replay-completed.

4 Claims, 7 Drawing Sheets

FIG.2

| IDENTIFICATION NUMBER | TITLE NAME | RECORDING DATE AND TIME | REPLAY-COMPLETED FLAG | REPLAY HISTORY INFORMATION | | |
|---|---|---|---|---|---|---|
| 0001 | TITLE A | 05-08-21 19:00-19:30 | 1 | | | . . . . |
| | TITLE B | 05-08-21 20:00-20:55 | 0 | 00:00~ 25:18 | 10:00~ 15:18 | |
| | TITLE C | 05-08-22 21:00-22:00 | 1 | | | |
| | TITLE D | 05-08-25 13:00-13:30 | 0 | 00:00~ 15:18 | | |
| 0002 | TITLE AX | 05-08-30 10:00-11:30 | 1 | | | |
| | TITLE BX | 05-08-30 19:00-19:30 | 1 | | | |
| | TITLE CX | 05-08-31 19:00-19:30 | 1 | | | |
| | TITLE DX | 05-09-04 19:30-19:58 | 0 | 00:00~ 10:32 | | |
| | TITLE EX | 05-09-05 21:00-22:10 | 0 | 00:00~ 20:18 | 10:00~ 15:32 | |
| | TITLE FX | 05-09-06 21:00-22:10 | 0 | 00:00~ 32:54 | 30:00~ 45:06 | |
| ⋮ | ⋮ | ⋮ | ⋮ | ⋮ | ⋮ | ⋮ |

FIG.6

NOT-COMPLETELY-REPLAYED TITLE MENU

| TITLE NAME | RECORDING DATE AND TIME | REPLAY TIME PERIOD | |
|---|---|---|---|
| TITLE DX | 05-09-04 19:30-19:58 | 28:00 | ▨▨▨░░░░░ |
| TITLE EX | 05-09-05 21:00-22:10 | 70:00 | ▨▨▨▨░░░░ |
| TITLE FX | 05-09-06 21:00-22:10 | 70:00 | ▨▨▨▨▨▨▨░ |

FIG.7

REPLAY-COMPLETED TITLE MENU

| TITLE NAME | RECORDING DATE AND TIME | REPLAY TIME PERIOD |
|---|---|---|
| TITLE AX | 05-08-30 10:00-11:30 | 90:00 |
| TITLE BX | 05-08-30 19:00-19:30 | 30:00 |
| TITLE CX | 05-08-31 19:00-19:30 | 30:00 |

OPTICAL DISK DEVICE

CROSS REFERENCE

This Nonprovisional application claims priority under 35 U.S.C. §119(a) on Patent Application No. 2005-379550 filed in Japan on Dec. 28, 2005, the entire contents of which are hereby incorporated by reference.

BACKGROUND OF THE INVENTION

The present invention relates to an optical disk device which replays a title recorded upon an optical disk such as a DVD or the like.

Recently, optical disk devices which read and replay data for titles recorded upon optical disks such as DVDs or the like have become generally widespread. A typical such optical disk device is endowed with a function of outputting a title menu image in which, for each title recorded upon that optical disk which is loaded, the title name and the recording date and time and so on are displayed as a list, and of allowing the user to select a title to be replayed. This title menu image is displayed upon a display device which is connected to the optical disk device. The user checks the title names, recording dates and times and so on in this title menu image, and selects a title to be replayed. To put it in another manner, the title menu image is utilized by the user for checking the titles which are recorded upon that DVD which is loaded, and for assisting him in input actuation to select a title to be replayed.

Furthermore, in Japanese Laid-Open Patent Publication 2002-238025 for example, a device is proposed in which, by displaying an image which indicates, for each title which is recorded upon a recording medium such as a DVD or the like, the recording time for this title, and also the remaining recordable time period upon this recording medium, thereby the user is enabled simply and easily to confirm the recording time for each of the titles which are recorded upon this recording medium, and the remaining recording time thereupon.

However, with such a prior art type optical disk device, it has not been possible for the user to check, upon the title menu image: whether or not a title is one which has not yet been replayed (viewed); if it is a title which has been replayed, whether or not it has been nearly completely replayed; or conversely, if it is a title of which only a portion has been replayed, whether or not it is a title of which the portion which has not been replayed (the not-completely-replay portion) is comparatively large. Due to this, the user must himself decide, from his own recollections of the title names etc., whether each of the titles is one which has already been replayed or not and so on, and sometimes he may erroneously decide that a title which has actually not yet been replayed has already been replayed, or, conversely, that a title which has actually already been replayed has not yet been replayed. Furthermore, in order for the user to make the decision described above for a title of which his memory is unclear as to whether or not it has already been replayed, he is sometimes finally obliged to replay that title, in order to check its contents. Thus, with a prior art type optical disk device, the presentation of information via the title menu image has not been performed adequately. Due to this, there has been the problem that the selection of a title to be replayed has been troublesome, so that the ease of use has not been good.

The object of the present invention is to provide an optical disk device which is capable of sufficiently assisting actuation by the user to select a title to be replayed upon the title menu image, and thereby to provide an optical disk device whose ease of use is enhanced.

SUMMARY OF THE INVENTION

The optical disk device according to the present invention includes a storage means which, for each optical disk, and for each title recorded upon that optical disk, stores whether or not it is a replay-completed title, and an output means which separates the titles recorded upon an optical disk which is loaded into replay-completed titles and titles which are not replay-completed, based upon the contents stored in the storage means, and which selectively outputs a first title menu image consisting of the replay-completed titles, or a second title menu image consisting of the titles which are not replay-completed.

Accordingly, based upon the contents stored in the storage means, the output means is able selectively to output either a list of the replay-completed titles which are recorded upon the optical disk which is loaded, or a list of those titles which are not replay-completed (i.e. of the not-completely-replay titles). In other words, it is possible to provide a display to the user which discriminates between the titles which are replay-completed and those which are not replay-completed. Due to this, the user is enabled to check in a simple and easy manner whether or not there are any titles which are not-completely-replay, and if there are, which of them are not-completely-replay. To put it in another manner, it is possible to afford sufficient assistance to actuation by the user to select a title for being replayed, and as a result, when the user is selecting a title to be replayed, it is possible to anticipate enhancement of the ease of use from his point of view.

Furthermore, it would also be acceptable to provide a replay-completed decision means which, for each the title, decides that it is a replay-completed title if the portion thereof which has been replayed is greater than a proportion determined in advance. In this case, by the storage means storing the replay history for the titles which are not replay-completed, for the not-completely-replay titles, it is possible to manage the portions which have been replayed (the replayed portions) and the portions which have not been replayed (the not-completely-replay portions) in an accurate manner. Moreover, by the storage means deleting the replay history of a title for which it has been decided by the replay-completed decision means that it is replay-completed, it is possible to economize upon the required storage capacity of the storage means.

Moreover, it would also be acceptable to arrange to output the second title menu image if a title which has been recorded within the time period which is determined in advance is a title which is not replay-completed, and thereafter to output the first title menu image when a predetermined input actuation takes place. With this structure, if there is a not-completely-replay title which has recently been recorded upon the optical disk—for example, a not-completely-replay title which has been recorded during the last week—it is possible to notify the user of this fact rapidly. Furthermore, the convenience of use from the user point of view is also enhanced, since most users replay and view those titles upon an optical disk which have most recently been recorded.

Furthermore, it would also be acceptable to arrange to output the first title menu image if there are no titles which have been recorded within the time period determined in advance which are not replay-completed, and thereafter to output the second title menu image when a predetermined input actuation takes place. With this structure, the first title menu image is outputted when the titles, although they have recorded upon the optical disk, are ones which have not been replayed for some considerable time, in other words when they are ones which do not accord with the preferences of the user.

Furthermore, if it is arranged for the output means to output a second title menu image which includes, for each title, an image which indicates the proportion thereof which has been replayed, then it is possible to enable the user to confirm, for each not-completely-replay title, the extent to which it has been replayed in the past.

BRIEF DESCRIPTION OF THE DRAWINGS

FIG. 2 is a figure showing replay history information which this DVD device according to an embodiment of the present invention stores in a replay history information storage area;

FIG. 6 is a figure showing a not-completely-replay title menu image which is outputted by the DVD device of this embodiment; and FIG. 7 is a figure showing a replay-completed title menu image which is outputted by the DVD device of this embodiment.

DETAILED DESCRIPTION OF THE INVENTION

Figure 1:
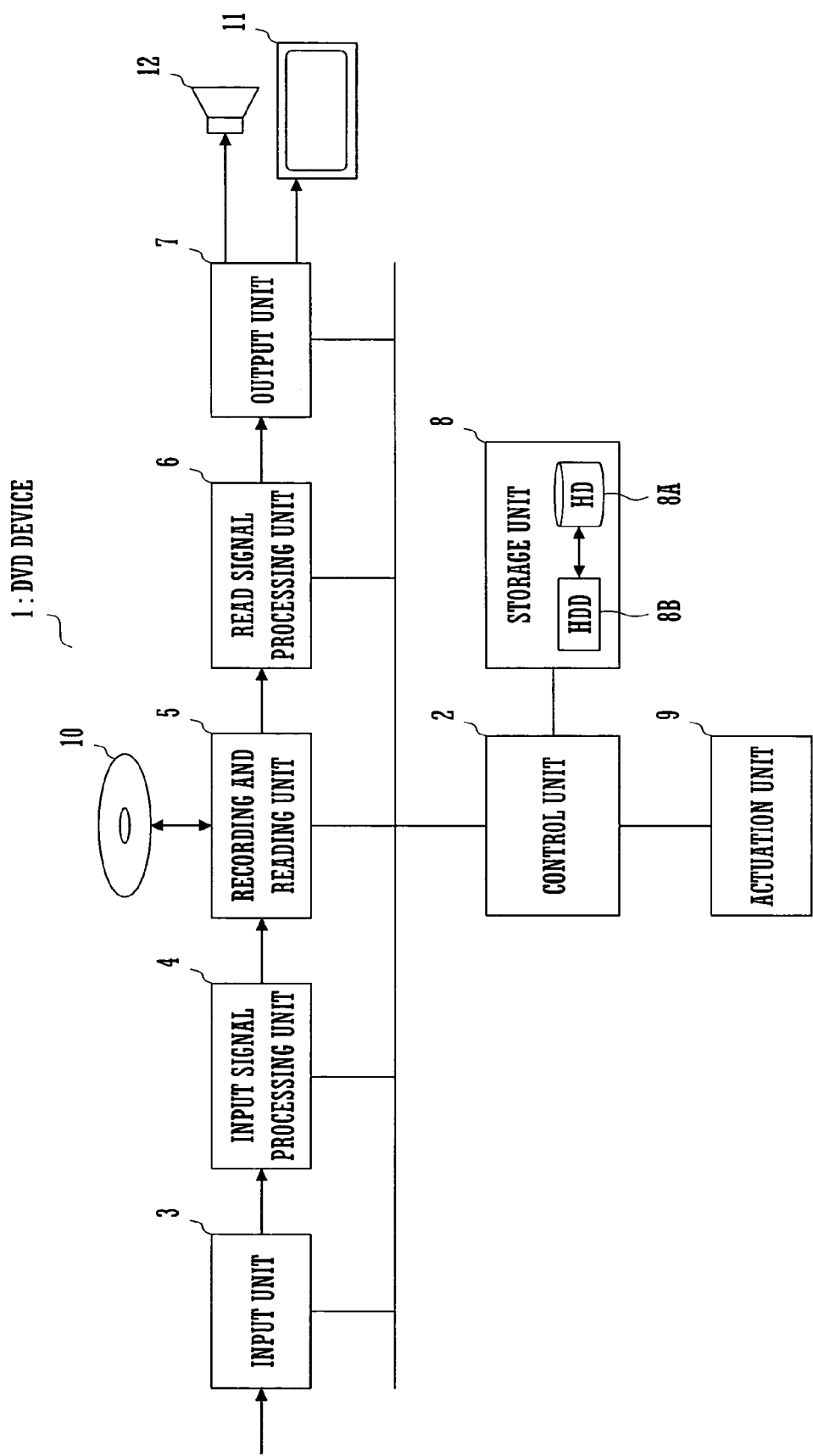
FIG. 1 is a block diagram showing the structure of the main portion of a DVD device which is an embodiment of the present invention.

FIG. 1 is a block diagram showing the structure of the main portion of a DVD device which is an embodiment of the present invention. The DVD device 1 of this embodiment comprises a control unit 2, an input unit 3, a input signal processing unit 4, a recording and reading unit 5, a read signal processing unit 6, an output unit 7, a storage unit 8, and an actuation unit 9. The DVD device 1 of this embodiment performs recording of titles upon a DVD 10, and replay of titles which are recorded upon the DVD 10. The control unit 2 is endowed with a calendar function of managing the present date, a clock function of managing the present time instant, and also a title menu image creation function of creating a title menu image which will be described hereinafter. This title menu image creation function is a function of creating a so called OSD image. Furthermore, the control unit 2 controls the operation of the various sections described above.

Television broadcast signals which are received by an antenna not shown in the figures are inputted to the input unit 3. This input unit 3 comprises a tuner which extracts, from these inputted television broadcast signals, the television broadcast signal of some selected channel. The input unit 3 inputs this television broadcast signal which has been extracted by the tuner to the input signal processing unit 4. In other words, the input unit 3 inputs the signal of the title which is being broadcast upon the selected channel to the input signal processing unit 4. Furthermore, sometimes a title signal recorded upon a DVD 10 is inputted to the input unit 3 from another connected device. The input unit 3 also inputs such a signals of a title which has been inputted from some other connected device to the input signal processing unit 4. If the signal of a title inputted from the input unit 3 is an analog signal, the input signal processing unit 4 converts it to a digital signal. From the signal of the title which has been inputted, the input signal processing unit 4 acquires the video data and the audio data of this title, encodes the video data and the audio data which has thus been acquired, and creates a multiplexed system stream by packetizing the encoded video data and audio data into predetermined units. The input signal processing unit 4 inputs this system stream to the recording and reading unit 5 as recording data to be recorded upon the DVD 10.

The recording and reading unit 5 comprises a pickup head (not shown in the figures) which irradiates laser light upon the DVD 10 and detects the light reflected therefrom, a servo control unit (not shown in the figures) which performs focus servo control and tracking servo control for controlling the irradiation position of the laser light upon the DVD 10 and the like, and so on. Furthermore, the recording and reading unit 5 performs recording control so as to modulate the laser light which is irradiated upon the DVD 10 based upon the recording data which is to be recorded upon this DVD 10. Moreover, the recording and reading unit 5 inputs a read signal which has been produced by reading out the recorded data of a title recorded upon the DVD 10, i.e. a so called RF signal, to the read signal processing unit 6. The read signal processing unit 6 processes this inputted read signal and acquires a system stream, and separates and extracts video data and audio data from this system stream. Furthermore, the read signal processing unit 6 decodes these extracted video data and audio data, and outputs decoded video data and audio data to the output unit 7. A display device 11 and a speaker 12 are connected to the output unit 7. The output unit 7 outputs a replay video signal based upon the video data, and a synchronized replay audio signal based upon the audio data, which have been inputted from the read signal processing unit 6. The replay video signal is inputted to the display device 11. And the display device 11 displays an image based upon this replay video signal which has thus been inputted. Furthermore, the speaker 12 emits sound based upon the replay audio signal which is inputted thereto. The output unit 7 also is endowed with a function of outputting a title menu image which is created by the control unit 2.

It should be understood that the output unit 7 comprises analog output terminals at which the replay video signal and the replay audio signal are outputted as analog signals, and digital output terminals at which the replay video signal and the replay audio signal are outputted as digital signals.

The storage unit 8 comprises a hard disk 8A (HD 8A) which is a storage medium, and a hard disk drive 8B (HDD 8B) which performs recording of data upon this hard disk 8A and reading out of data therefrom. Upon this hard disk 8A of the storage unit 8, there is provided a title information storage area in which is stored, for each DVD 10, management information and replay history information for the titles recorded upon that DVD 10 (refer to FIG. 2). This management information includes the title name, its recording date and time, and a replay-completed flag which indicates whether or not that title is a title which has been almost replayed (i.e. is a replay-completed title). Furthermore, only for titles which are not-replayed, replay history information is stored. To express this differently, replay history is not stored for a replay-completed title. This replay history information is information created, for each title which is replayed, which indicates the portion of that title which has been replayed; and this replay history information is stored cumulatively. Here by a replay-completed title is meant one for which the value of the corresponding replay-completed flag is "1", while by a not-completely-replay title is meant one for which the value of the corresponding replay-completed flag is "0". As will be described hereinafter, when registering a title which is recorded upon the DVD 10 in the title information storage area, the DVD device 1 sets the replay-completed flag for that title to "0"; while, when it has been decided that portions greater than or equal to 85% of the entirety of that title have been replayed, it sets the flag to "1". Furthermore, when the replay-completed flag is set to "1", the DVD device 1 deletes the replay history information which corresponds to that title. These processes will be described in detail hereinafter.

The actuation unit 9 comprises a plurality of actuation keys and a remote control reception unit which receives control codes transmitted from a remote control device not shown in the figures. This actuation unit 9 notifies to the control unit 2 codes which correspond to actuation keys which have been actuated by the user, and control codes received from the remote control reception unit.

In the following, the operation of this DVD device 1 according to this embodiment will be explained. The DVD device 1 of this embodiment is able to record a title upon a DVD 10 which is loaded thereinto. Since this process of recording a title upon the DVD 10 is almost the same as in the case of a per se known DVD device, it will here only be explained simply. When input has been performed for starting the recording of a title upon the DVD 10, or when the present time reaches a recording time instant which has been set in advance for video recording, then the DVD device 1 starts recording the title upon the DVD 10. The data of the title which is recorded upon the DVD 10 is inputted to the input unit 3. Along with the input signal processing unit 4 encoding the video data and the audio data of the title being recorded upon the DVD 10, the encoded video data and audio data are packetized, and a system stream is created by multiplexing them together. Based upon this system stream which has been created by the input signal processing unit 4, the recording and reading unit 5 controls the pulse modulation of the laser light which the pickup head irradiates upon the DVD 10, the laser power, and so on. Furthermore it records, in a recording management area (RMA) of the DVD 10, information such as the title name of the title which is now being recorded, the recording date and time, the recording start position, the recording end position, and so on.

Figure 3:
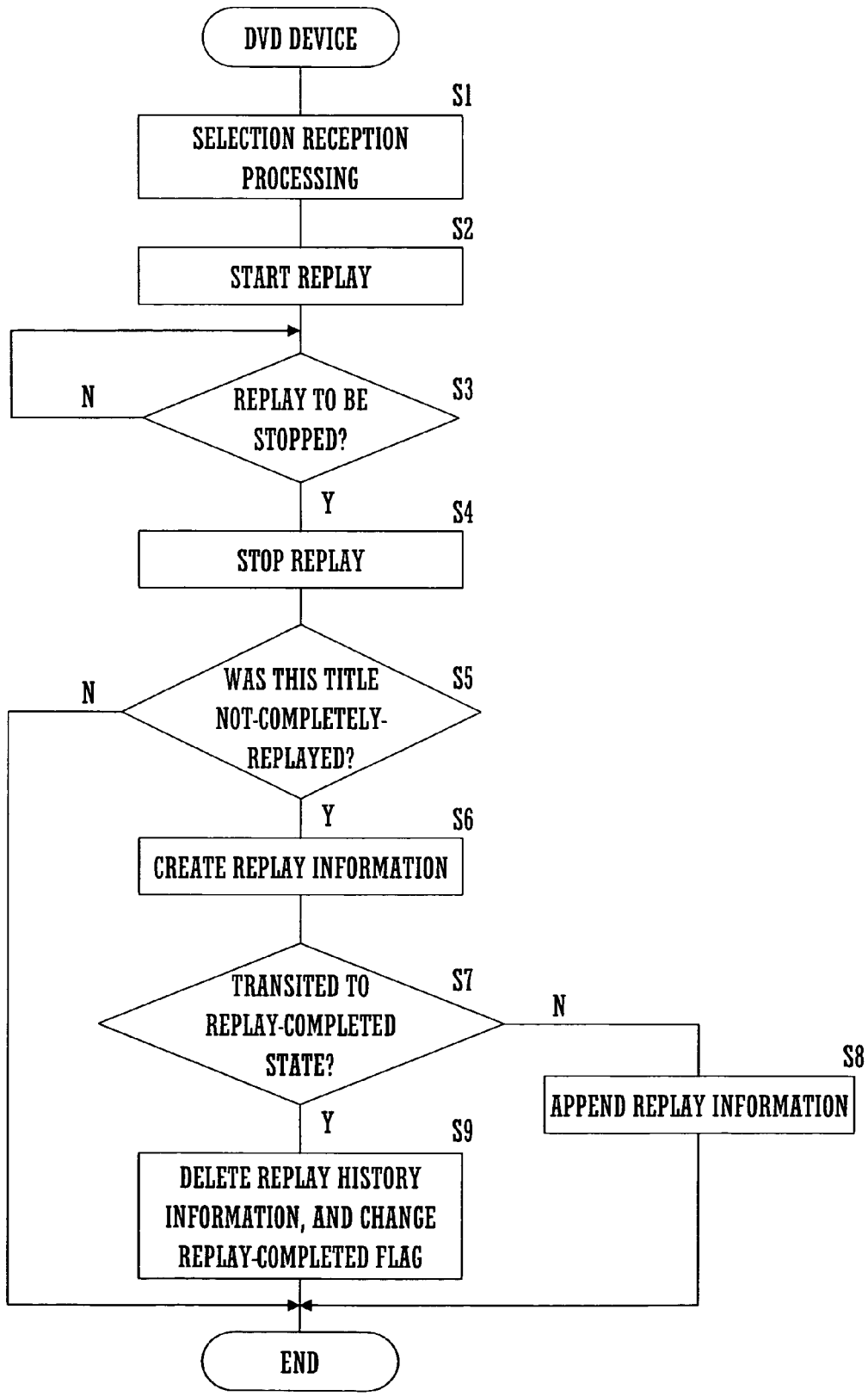
FIG. 3 is a flow chart showing replay operation by the DVD device of this embodiment.

Next, the replaying of a title which is recorded upon a DVD 10 will be explained. FIG. 3 is a flow chart showing the replay operation by the DVD device of this embodiment. First, the DVD device 1 performs selection reception processing (a step S1) to receive selection of which title is to be replayed, among the titles which are recorded upon the DVD 10 which has been loaded.

Figure 4:
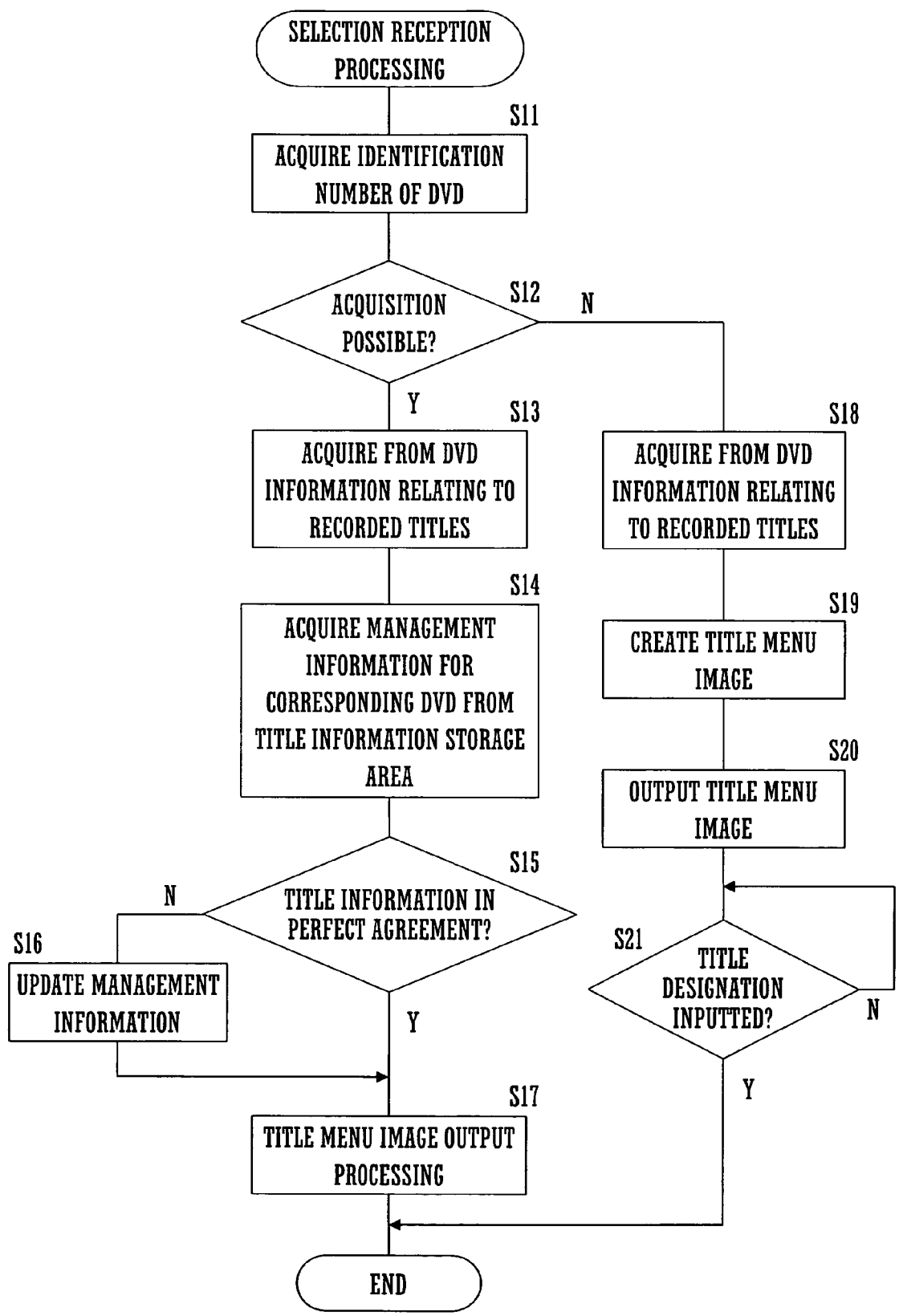
FIG. 4 is a flow chart showing selection reception processing by the DVD device of this embodiment.

FIG. 4 is a flow chart showing this selection reception processing in the step S1. First, the DVD device 1 acquires an identification number which is recorded in a predetermined recording area of the DVD 10 which is loaded (a step S11). With the DVD device 1 of this embodiment, when a DVD 10 has been loaded, it is detected whether or not an identification number is recorded in this predetermined recording area of the DVD 10, and, if no identification number is recorded therein, then an identification number is recorded in this predetermined recording area of the DVD 10. This process is performed when recording the above described title upon the DVD 10. At this time, the identification number which the DVD device 1 inscribes upon the DVD 10 is a serial number. In concrete terms, for a DVD 10 upon which no identification number is yet recorded in the predetermined recording area, the DVD device 1 inscribes an identification number obtained by adding 1 to the maximum-valued DVD 10 identification number stored in the title information storage area of the hard disk 8A of the storage unit 8. Furthermore, the identification number of the DVD 10 which is inscribed at this time is stored in the title information storage area.

The DVD device 10 then decides whether or not it has been possible, in the step S11, to acquire an identification number from the DVD 10 (a step S12). In concrete terms, it decides whether or not an identification number has been read out from the predetermined recording area of the DVD 10. If the DVD device 1 decides in the step S12 that an identification number has been acquired, then, for each of the titles recorded upon this DVD 10, it reads in and acquires, from the recording management area or the lead-in area of the DVD 10, information such as the name of this title and its recording date and time and so on (a step S13). Furthermore, the DVD device 1 searches the title information storage area of the hard disk 8A of the storage unit 8 using the identification number which was acquired in the step S11 as a key, and reads in the management information for the DVD 10 having the corresponding identification number (a step S14). Then the DVD device 1 decides whether or not the title which is recorded on the DVD 10, as read in the step S13, and the title which is included in the management information, read in during the step S14 from the title information storage area of the hard disk 8, are in perfect agreement with one another (a step S15). In this step S15 it is decided whether or not, between the previous replay episode and this replay episode, a new title has been recorded upon this DVD 10, and whether or not any title which was recorded upon this DVD 10 has been deleted.

If in the step S15 it is decided that the two titles do not perfectly agree with one another, then the DVD device 1 updates the management information for the corresponding DVD 10 in the title information storage area of the hard disk 8A (a step S16). In concrete terms, if a new title has been recorded upon the DVD 10, then the DVD device 1 appends the title name of this title, its recording date and time, and its replay-completed flag to the management information for the corresponding DVD 10 which is stored in the title information storage area of the hard disk 8A. At this time, for the title name and the recording date and time, the title name and the recording date and time which were acquired in the step S13 are set, while, for the replay-completed flag, "0" is set to indicate that this title is not-completely-replay. At this time point, no replay history information exists which corresponds to the title which has been appended this time. Furthermore, if a title which was recorded upon the DVD 10 has been deleted, then the management information and the replay history information for the title which is deleted are deleted from the information for the corresponding DVD 10 which is stored in the title information storage area of the hard disk 8A.

If in the step S15 it is decided that the two titles are in perfect agreement with one another, or after the processing of the step S16 has been performed, then the DVD device 1 creates a title menu image from the output unit 7, and performs image output processing for this title menu image which is to be outputted (a step S17). The title menu image output processing which is performed here is performed based upon the management information and upon the replay history information which are stored in the title information storage area of the hard disk 8A at this time point. In other words, if the processing of the above described step S16 has been performed, the DVD device 1 creates and outputs the title menu image based upon the management information and the replay history information which have been updated by the processing of the step S16.

Figure 5:
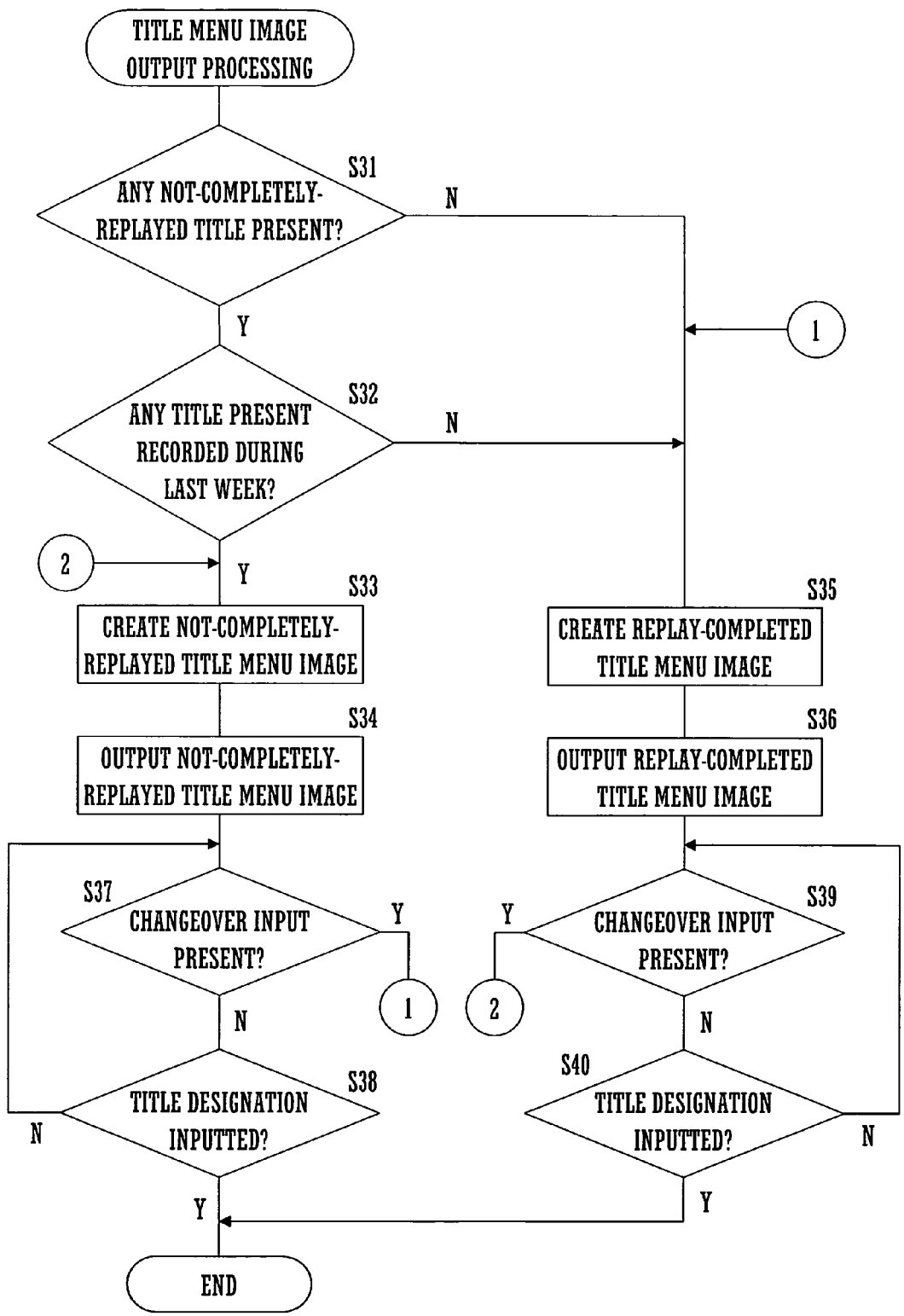
FIG. 5 is a flow chart showing title menu image output processing by the DVD device of this embodiment.

FIG. 5 is a flow chart showing this title menu image output processing in the step S17. The DVD device 1 decides whether or not, among the titles which are recorded upon the DVD 10 which is loaded, any not-completely-replay title is present (a step S31). This decision in the step S31 is performed based upon the replay-completed flags in the management information which is stored in the title information storage area of the hard disk 8A. If it is decided in the step S31 that at least one not-completely-replay title is present, then the DVD device 1 decides (a step S32) whether or not, among these not-completely-replay titles, there is at least one title which has been recorded upon the DVD 10 during a certain time period which is determined in advance (here, during the last week). This decision in the step S32 is performed based upon the recorded dates and times in the management information which is stored in the title information storage area of the hard disk 8A. By the processing which is performed in the steps S31 and S32, the DVD device 1 decides whether or not there is any title which has been recorded during the last week and which has not been replayed.

If, due to the processing performed in the steps S31 and S32 described above, the DVD device 1 decides that, upon the DVD 10 which is loaded, there is indeed at least one title which has been recorded during the last week and which has not been replayed, then it extracts those not-completely-replay titles recorded upon the DVD 10 which is loaded, in other words those titles for which the replay-completed flag is "0", creates a not-completely-replay title menu image (in the Claims this is termed the "second title menu image") which specifies a list of these extracted not-completely-replay titles (a step S33), and outputs this not-completely-replay title menu image from the output unit 7 (a step S34). By this procedure, this not-completely-replay title menu image is displayed upon the display device 11 which is connected to the output unit 7. In this not-completely-replay title menu image which is created in the step S33, for each such not-completely-replay title, there is included a bar graph which indicates the proportion of that title which has been replayed.

FIG. 6 is a figure showing a not-completely-replay title menu image which is displayed by the display device. As shown in FIG. 6, for each not-completely-replay title, a bar graph is displayed upon the display device 11 which specifies the name of this title, its recording date and time, the replay time thereof, and the proportion of this title which has been replayed. Here, the replay time of a title means its length. Furthermore, the proportion of each not-completely-replay title which has been replayed is calculated from the replay history information. For example, for a title of which no portion at all has been replayed in the past (in other words, for a title which has no replay history information), the proportion thereof which has been replayed is calculated as being 0. Furthermore, for a title which has been partially replayed in the past (in other words, for a title which does have some replay history information), the portions which have been replayed is extracted from the corresponding items of replay history information, and the total time of all these portions which have been replayed is calculated. At this time, if there are two or more portions which have been replayed, this calculation of the total time of all these portions which have been replayed is performed without double-counting overlapped sections. For example, for a title which, according to the twice previous replay history information, has been replayed from its start to a point 10 minutes after its start, and which, according to the once previous replay history information, has been replayed from a point 5 minutes after its start to a point 15 minutes after its start, the replay time period is not counted as being 20 minutes, but as being 15 minutes.

On the other hand if, due to the processing performed in the steps S31 and S32 described above, the DVD device 1 decides that, upon the DVD 10 which is loaded, there is not even one title which has been recorded during the last week and which has not been replayed, then it extracts the replay-completed titles which are recorded upon the DVD 10 which is loaded, in other words those titles for which the replay-completed flag is "1", creates a replay-completed title menu image (in the Claims this is termed the "first title menu image") which specifies a list of these extracted replay-completed titles (a step S35), and outputs this replay-completed title menu image from the output unit 7 (a step S36). FIG. 7 is a figure showing such a replay-completed title menu image which is being displayed upon the display device. In FIG. 7, for each such replay-completed title, there are displayed upon the display device 11 its title name, its recording date and time, and its replay time period.

When, with the DVD device 1 in its state in which it is outputting the not-completely-replay title menu image from the output unit 7, an input is performed (a step S37) via the actuation unit 9 to change over the title menu image (in the Claims this is termed the "predetermined input"), then the DVD device 1 performs the processing of the steps S35 and S36, and outputs the replay-completed title menu image from the output unit 7. Conversely when, with the DVD device 1 in its state in which it is outputting the replay-completed title menu image from the output unit 7, an input is performed (a step S39) via the actuation unit 9 to change over the title menu image (in the Claims this is termed the "predetermined input"), then the DVD device 1 performs the processing of the steps S33 and S34, and outputs the not-completely-replay title menu image from the output unit 7. In other words, by performing input actuation via the actuation unit 9 to change over the title menu image, the user is able to display either the not-completely-replay title menu image or the replay-completed title menu image upon the display device 11, and to check its contents.

Since, in this manner, with the DVD device 1 of this embodiment of the present invention, for the titles which are recorded upon the DVD 10 which is loaded, selectively, either the not-completely-replay title menu image which is built up from the not-completely-replay titles is outputted, or the replay-completed title menu image which is built up from the replay-completed titles is outputted, accordingly it is possible for the user simply and easily to check which titles, among the titles which are recorded upon the DVD 10 which is loaded, have not been replayed. Furthermore, changeover of the title menu image which is displayed upon the display device 11 (the not-completely-replay title menu image or the replay-completed title menu image) is performed by performing predetermined input actuation upon the actuation unit 9. Accordingly, even when the not-completely-replay title menu image is being displayed upon the display device 11, the user is able, with a simple actuation, to display the replay-completed title menu image upon the display device 11, and to check the replay-completed titles. In the same manner, even when the replay-completed title menu image is being displayed upon the display device 11, the user is able, with a simple actuation, to display the not-completely-replay title menu image upon the display device 11, and to check the not-completely-replay titles.

Furthermore, with regard to the not-completely-replay titles, bar graphs are displayed upon the not-completely-replay title menu image which indicate the proportions of these not-completely-replay titles which have been replayed. Accordingly, for these not-completely-replay titles, it is possible for the user simply and easily to check to what extent they have already been partially played in the past.

When input to change over the title menu image is not performed in the step S37 or the step S39, but instead input is performed to designate a title (the steps S38, S40), then this process whose flow chart is shown in FIG. 5 is terminated. This input to designate a title to be replayed is performed by actuation to select any desired title from among the titles which are being displayed in the title menu image which is being displayed upon the display device 11 (the replay-completed title menu image or the not-completely-replay title menu image), and by actuation to command replay of the title which is being selected. The selection of a title is performed by actuating cursor keys which are provided upon the actuation unit 9 or upon the remote control device, while the actuation to command replay of the selected title is performed by actuation a replay key which is provided upon the actuation unit 9 or upon the remote control device.

When the title menu image output processing of the step S17 (i.e. the processing shown in FIG. 5 and described above) has been completed, then the DVD device 1 proceeds to the step S2 of the FIG. 3 flow chart, and starts replay of the title which has been set this time. Furthermore, if in the step S12 it was decided that it had not been possible to acquire the identification number of the DVD 10, then, by reading the recording management area or the read in area of that DVD 10, the DVD device 1 acquires, for each title which is recorded upon the DVD 10, information such as the name of that title, its recording date and time, and so on (a step S18). The processing in the step S18 is the same as that in the step S13 described above. The DVD device 1 creates a title menu image based upon this information which has been acquired from the DVD 10 in the step S18 (a step S19), and outputs this title menu image (a step S20). The title menu image which is created in the step S19 is not one which distinguishes between replay-completed titles and not-completely-replay titles. When a designation of a title to be replayed is inputted (a step S21), the DVD device 1 proceeds to the step S2, and starts replay of the title which has been designated at this time. The input in the step S21 for designating a title to be replayed is performed by actuation to select any desired title from among the titles which are being displayed in the title menu image which is being displayed upon the display device 11, and by actuation to command replay of the title which is being selected. As described above, these actuations are performed by actuation of cursor keys, and by actuation of a replay key, which are provided upon the actuation unit 9 or upon the remote control device.

After the replaying of this title has started in the step S2, the DVD device 1 waits for the replaying of this title to end (a step S3). In this step S3, the system waits until either the user performs input actuation to stop replaying the title, or the timing arrives at which the replaying of this title which is being replayed is completed. When the DVD device 1 decides in the step S3 that the replay end timing of the title has arrived, then it stops replaying the title (a step S4), and makes a decision as to whether or not the title which has been replayed this time was a not-completely-replay title (a step S5). In this step S5, it is decided whether or not the state before the start of this replay episode was the not-completely-replay state. If it is decided in the step S5 that the DVD device 1 was a replay-completed title, then the DVD device 1 terminates this processing. On the other hand, if it is decided in the step S5 that the DVD device 1 was a not-completely-replay title, then the DVD device 1 creates replay information which specifies, for the title which has been replayed this time, the portion replayed this time—for example, from its start to ten minutes through it, or from its start to its end (a step S6). And the DVD device 1 makes a decision, for the title which has been replayed this time, as to whether or not, due to this episode of replaying, it has transited from the not-completely-replay state to the replay-completed state (a step S7). This process in the step S7 corresponds to the "decision means" of the Claims. In this step S7, for the title which has been replayed this time, it is decided whether or not the proportion of the title which has been replayed is greater than or equal to 85% of the total, using the replay history information which is stored in the title information storage and the replay history information which was created in the step S6; and, if this proportion is greater than or equal to 85%, then it is decided that a transition has occurred to the replay-completed state. If it is decided in the step S7 that a transition has not occurred to the replay-completed state, then the DVD device 1 appends (a step S8) the replay history information which was created in the step S6 to the corresponding replay history information for this title which is stored in the title information storage area of the hard disk 8A, and terminates this processing. On the other hand, if it is decided in the step S7 that a transition has indeed occurred to the replay-completed state, then the DVD device 1, along with deleting the corresponding replay history information for this title which is stored in the title information storage area of the hard disk 8A, also updates the replay-completed flag from "0" to "1" (a step S9), and then terminates this processing.

In this manner, with the DVD device 1 of this embodiment, when a transition in the state of a title which is recorded upon the DVD 10 takes place from the not-completely-replay state to the replay-completed state, the replay history information which is stored in the title information storage area of the hard disk 8A is deleted. Since replay history information for replay-completed titles is thus not kept stored in the title information storage area of the hard disk 8A for an indefinite time, accordingly it is possible to economize upon the title information storage area upon the hard disk 8A.

Finally, in the above described explanation of an embodiment of the present invention, all of the features are shown by way of example, and should not be considered as being limitative of the present invention. The scope of the present invention is not to be defined by any of the features of the embodiment described above, but only be the scope of the appended Claims. Moreover, equivalents to elements in the Claims, and variations within their legitimate and proper scope, are also to be considered as being included within the range of the present invention.

What is claimed is:

1. An optical disk device, comprising:
   output means which outputs, to a display device, a title menu image in which a list is displayed of title names of titles recorded upon an optical disk which is loaded;
   selection means which selects, upon the title menu image which is outputted by the output means, any desired title from among the titles whose title names are displayed;
   replay means which, when title replay has been commanded, starts replay of the title which is selected by the selection means at that time point;
   storage means which, for each optical disk, and for each title recorded upon that optical disk, stores whether or not it is a replay-completed title; and
   replay-completed decision means which, for each the title, decides that it is a replay-completed title if the portion thereof which has been replayed is greater than a proportion determined in advance,
   wherein the output means separates the titles recorded upon the optical disk which is loaded into replay-completed titles and titles which are not replay-completed, based upon the contents stored in the storage means, and selectively outputs a first title menu image consisting of the replay-completed titles, or a second title menu image consisting of the titles which are not replay-completed, and wherein the storage means stores replay history for titles which are not replay-completed, and, when it has been decided by the replay-completed decision means that a title has become replay-completed, deletes the replay history of that title.

2. An optical disk device as described in claim 1, further comprising a decision means which, for a title which has been recorded upon the optical disk which is loaded within a time period which is determined in advance, decides whether or not it is a title which is not replay completed, wherein, if it has been decided by the decision means that a title which has been recorded within the time period which is determined in advance is one which is not replay-completed, the output means outputs the second title menu image, and thereafter outputs the first title menu image when a predetermined input actuation takes place.

3. An optical disk device as described in claim 2, wherein, if it has been decided by the decision means that there are no titles which have been recorded within the time period which is determined in advance which are ones which are not replay-completed, the output means outputs the first title menu image, and thereafter outputs the second title menu image when a predetermined input actuation takes place.

4. An optical disk device as described in claim 1, wherein the output means outputs a second title menu image which includes, for each title, an image which indicates the proportion thereof which has been replayed.

* * * * *